INVENTOR
Willem D. van Zelm
BY Stevens, Davis, Miller and Mosher
ATTORNEYS

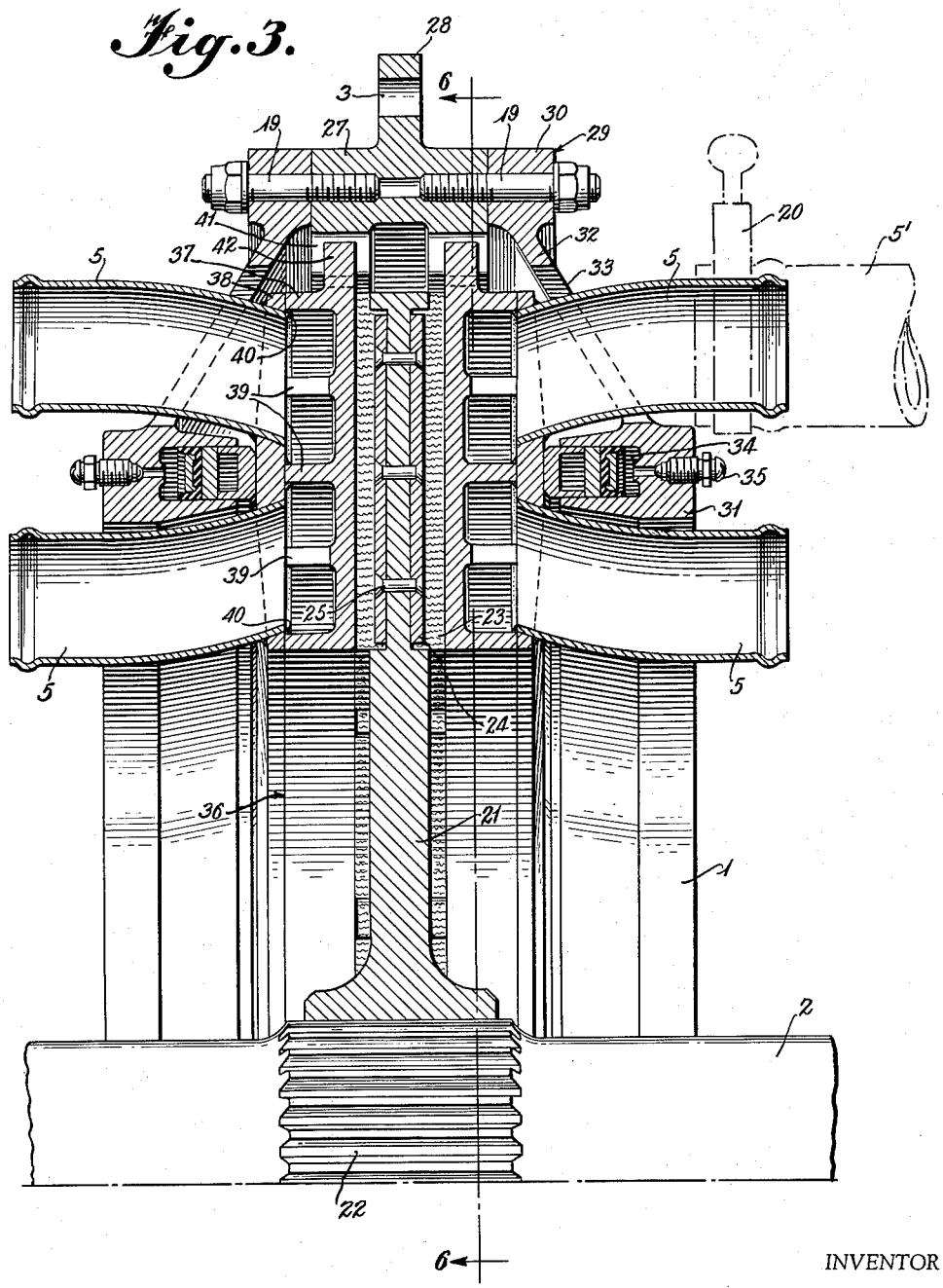

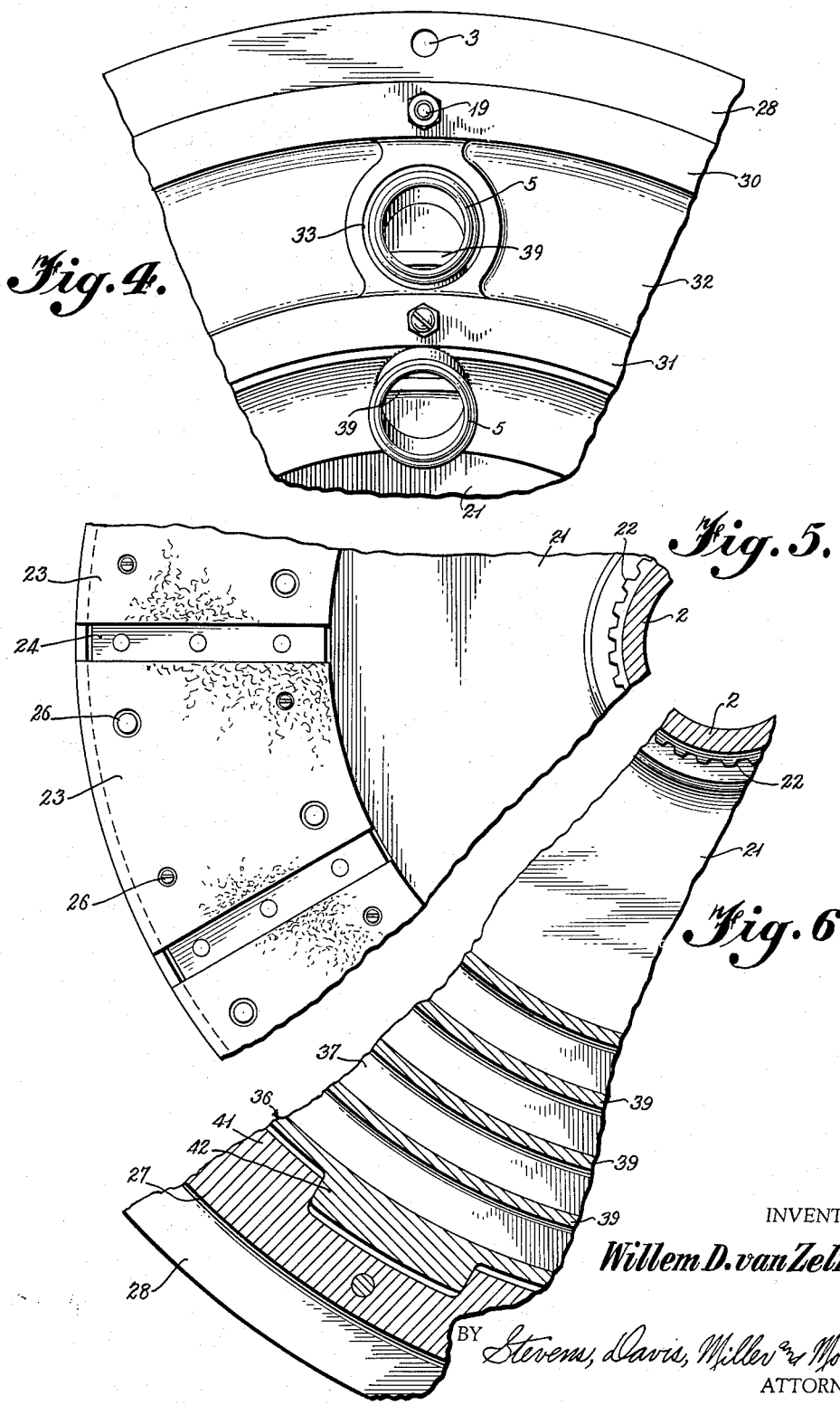

May 29, 1956 W. D. VAN ZELM 2,747,702
HYDRAULIC BRAKE WITH COOLING MEANS
Filed June 3, 1953 4 Sheets-Sheet 4

INVENTOR
Willem D. van Zelm
BY Stevens, Davis, Miller & Mosher
ATTORNEYS

2,747,702
Patented May 29, 1956

2,747,702
HYDRAULIC BRAKE WITH COOLING MEANS
Willem D. van Zelm, Ruxton, Md.

Application June 3, 1953, Serial No. 359,332

4 Claims. (Cl. 188—264)

This invention relates to an energy absorption device and more particularly to a high capacity, fluid-cooled braking mechanism.

As requirements for braking effort for the absorption of energy from rotating shafts has increased, the diameter and complexity of braking mechanisms has also increased. Ways have been devised to apply greater braking force to the energy absorption mechanism, but the problem of greater braking effectiveness is primarily one of a mechanism designed for more effective dissipation of heat. Present day requirements for high energy absorption or braking devices have exceeded the well-known drum and shoe arrangement and the disc and button brakes. Attempts have been made, through the increase of size and mass of metal involved, to absorb and dissipate heat to increase the efficiency of such brakes, but increasing the mass of parts usually results in increasing the energy of rotation of the parts that must also be absorbed. Cooling fins and blowers have also been employed, and some increases in effectiveness have been achieved in intermittent brake operation. No design has been evolved prior to this invention, however, that will give continuous, high-capacity brake performance in continuous brake operation.

It is an object of my invention to provide a heat dissipation device capable of continuous operation to absorb large quantities of energy.

It is another object of my invention to provide an energy absorption device that will afford braking effort for rotary shafts of very high thermal capacities.

It is another object of this invention to provide a brake employing a liquid coolant that will absorb large quantities of energy in continuous operation.

It is a further object of this invention to provide a high-capacity continuous operation energy absorption device in which the components are of small mass, so that very little of the braking effort will be expended in absorbing its own energy, that is, the inertia of the rotating assembly.

Further and other objects will be apparent from the description of this invention in the accompanying specification, where like numerals refer to like parts in the drawings forming a part thereof.

In the drawings,

Figure 3 is a sectional view of the device shown in Figure 2;

Figure 4 is a fragmentary view showing the coolant connections;

Figure 5 is a fragmentary view of the rotating disc and brake blocks;

Figure 6 is a fragmentary view on section 6—6 of Figure 3;

Figure 1:
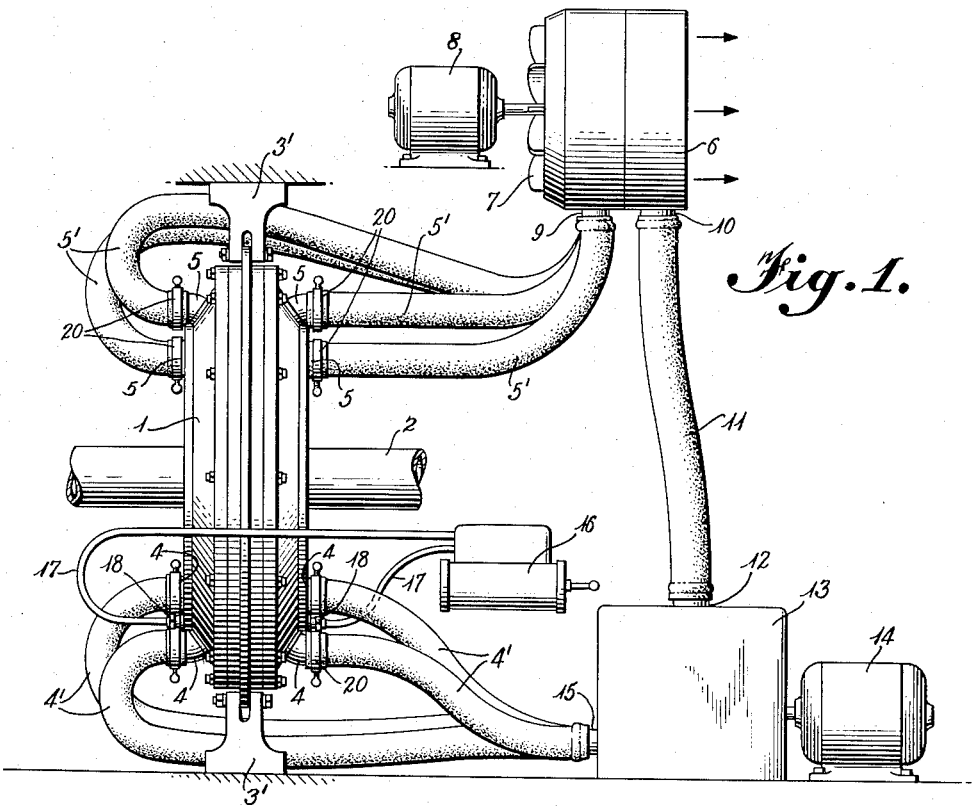
Figure 1 shows the energy absorption device and associated equipment.
Figure 2:
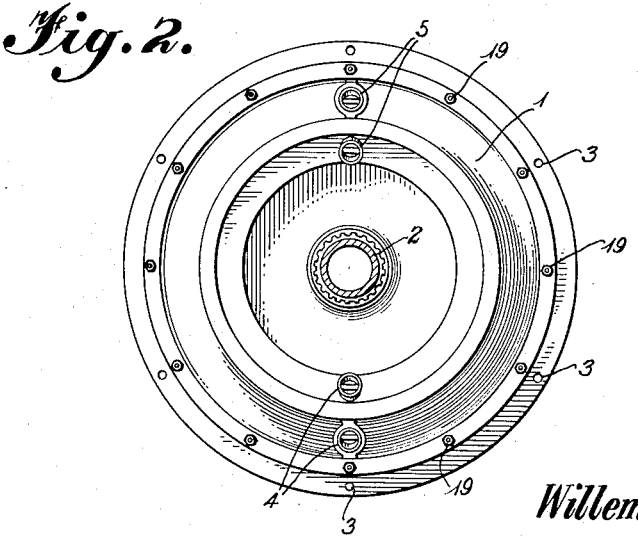
Figure 2 is a side view of the energy absorption device looking along the shaft.
Figure 7:
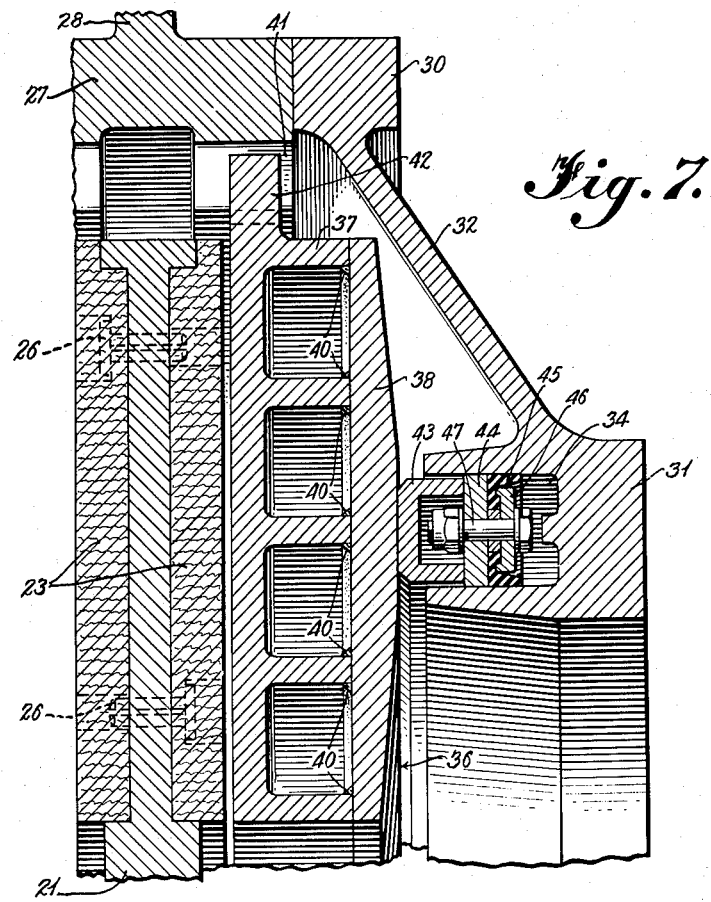
Figure 7 is an enlarged fragmentary view of the brake, showing the mechanism for the application of braking effort.

The energy absorption device 1, sometimes hereinafter referred to as a brake, is shown in Figure 1 with associated equipment. The brake 1 is mounted on shaft 2, which is rotated by some mechanism, such as a drum which pays out cable, or a wheel of high-power traction equipment the energy of which it is desired to absorb in braking effort. The braking mechanism 1 has mounting holes 3 by means of which it is secured around its periphery to mounting brackets 3' which hold brake 1 in a fixed position. Coolant hose connections 4 and 5 and hoses 4' and 5' afford inlets and outlets, respectively, for coolant fluid to the energy absorption device 1. Heat exchanger 6 has a fan 7 driven by motor 8 to pass cooling air through the heat exchanger. Connections 9 on heat exchanger 6 afford an inlet connection thereto to which hoses 5' are attached. Outlet connection 10 and hose 11 forms a part of the circulation system for the coolant fluid. Recirculation pump 13, driven by motor 14, receives the coolant fluid after it has passed through heat exchanger 6 through connection 12. The cooling fluid is recirculated through outlet 15, hoses 4' to inlet connections 4 on brake 1. A fluid pressure device is shown at 16, which may be a master cylinder or any device capable of applying high pressure to the brake shoes in the brake, as will be subsequently described in detail. Inlet lines 17 extend from cylinder 16 to inlet connections 18 on brake 1.

The foregoing description shows the energy absorption device in an environment including a heat exchanger, recirculation pump and hydraulic pressure system. However, it is to be understood that if the energy absorption device is located, for example, on shipboard or adjacent an adequate supply of coolant, pump 13 need only be a coolant pump rather than a recirculation pump and the heat exchanger can be eliminated. The outlet coolant fluid will be either pumped overboard or to a drain.

The essential features of the brake or energy absorption device 1 are shown in greater detail in Figure 3. Disc 21 is shown attached secured against rotation relative to shaft 2 by a spline portion 22. Brake blocks 23 are mounted around the periphery on each face of the disc. Brake blocks 23 may extend continuously around the periphery of any suitable radial width, or they may be as shown in Figure 3 as brake block segments. Intermediate members 24 are secured by rivets 25 to the disc to which adjoining brake blocks 23 abut. Members 24 afford torque blocks to relieve some of the strain of energy absorption from brake blocks 23. Brake blocks 23 are shown secured to the disc by rivets 26 or they may be secured by any of the high-temperature-resistant brake block bonding adhesives.

The principal component of the brake housing is brake-mounting member 27 which includes a peripheral mounting flange 28. The brake housing is completed by two similar members 29 secured on each side of the member 27 by stud bolts 19. Members 29 consist of an outer flange 30 and an inner flange 31 connected by an intermediate web 32.

Coolant fluid inlet and outlet apertures 33 are formed in the web 32. Coolant fluid outlet connections 5 are shown in Figure 3 secured in apertures in cover 38 of brake shoe assembly 36. Hose connections 5' are secured to outlet connections 5 by hose clamp 20. Coolant fluid flows from the passage in hollow brake shoe assembly 36 to either of the outlet connections 5. The outlet connections are rigidly secured to cover member 38 so that they move with movement of brake shoe assembly 36. The inlet connections 4 are secured in a similar manner to the brake shoe assembly. While in this design two inlet and two outlet connections are shown for each brake shoe assembly, it is to be understood that one or more are contemplated in the application of this invention. The number will be determined by the quantity of fluid, it being understood that hoses 5 should not be so large that their flexibility will be impaired.

In inner flange 31, an annular groove 34 is formed in which is mounted the mechanism for applying braking force to brake shoe assembly 36. Screw 35 is a conventional bleed screw for bleeding the hydraulic system.

Hollow brake shoe assembly 36 consists of a body member 37 and a cover member 38. The body member and cover member are annular in form, substantially coextensive with the peripheral portion of the brake disc 21 occupied by brake blocks 23. Body member 37 is hollow and has a series of concentric webs 39 extending around the annular hollow portion formed in body member 37 to afford passages for the flow of fluid therein. Cover member 38 is secured to body member 37, as by brazing shown at 40. It should be pointed out that the brake is fluid-tight if the inner and outer brazes are continuous.

Brake shoe assembly 36 is secured against rotation by a plurality of torque lugs 41 mounted on member 27 and a corresponding plurality of torque lugs 42 mounted on brake shoe assembly 36. These torque lugs permit axial motion along the shaft 22, but prevent rotary motion of assembly 36 with respect to housing 27.

Figure 8:
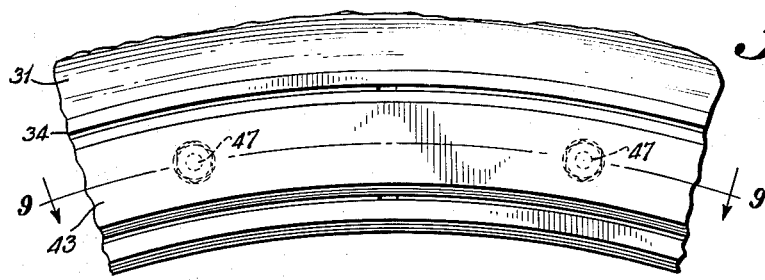
Figure 8 is a fragmentary view of the hydraulic mechanism shown in detail in Figure 7.
Figure 9:
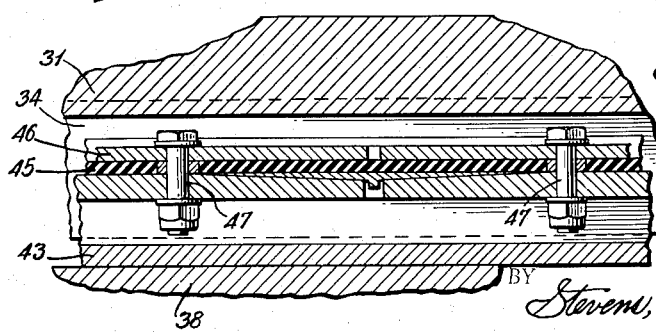
Figure 9 is a fragmentary sectional view taken on the line 9—9 of Figure 8.

The braking force is applied to brake shoe assembly 36 by, for example, the operation of a hydraulic piston mechanism positioned in groove 34 of flange 31. This mechanism consists of a channel ring 43 which bears directly against member 38 of the brake shoe assembly. A piston assembly transmits force from the fluid pressure in groove 34 to channel ring 43. This piston member consists of a ring 44, a pressure seal 45 and a retainer 46 secured together by a plurality of bolts 47. The channel ring 43 can have very wide tolerances with respect to groove 34 because its function is merely to transmit the force from the piston assembly to brake shoe assembly 36. The tolerance of piston member 44 must be a little more closely controlled with respect to groove 34 and since it is difficult to maintain close tolerances on two sides of a ring such as 44 with respect to groove 34 in a circle approximately twelve inches in diameter, it is provided that ring 44 will consist of segments as shown in Figures 8 and 9. The pressure seal will be continuous and its extrusion between the ends of the segments of piston 44 will be prevented by a bridge member 48. Retainer 46 can be made in segments if desired, since close tolerance on this member is not required.

From the foregoing description in connection with the drawings, it can be seen that as hydraulic fluid is applied by cylinder 16 through line 17, it will be introduced into the brake through groove 34 at connection 18. Hydraulic pressure in groove 34 will be transmitted by the piston assembly 44—45—46 through channel ring 43 to brake shoe assembly 36. The force generated by hydraulic pressure in groove 34 will be applied by brake shoe shoe assembly 36 to the peripheral brake lining material on disc 21. Either or both brake shoe assemblies may be moved by hydraulic pressure. If only one shoe moves axially under hydraulic pressure, while the other is held stationary, disc 21 will be moved on the spline portion of shaft 2 and the energy of rotation of disc 21 will be absorbed by the one shoe pressing the disc against the other shoe. The heat generated by the braking effort will be absorbed by brake shoe assembly 36 and dissipated by the flow of coolant through the shoe. The coolant may be cooled in heat exchanger 6 and recirculated through the cooling system, or the coolant may be supplied from a continuous source by pump 13, with the outlet coolant going to waste. It should be noted that the more massive components for the absorption of heat are stationary and the only rotating component whose inertia must be absorbed is the thin disc with the brake lining material arranged around the periphery. Therefore, substantially all of the energy absorbing capacity of the device is available for absorbing rotational energy of a load on the shaft, and very little is wasted in absorbing the rotational energy of massive components of the device.

It is to be understood that certain changes, alterations, modifications and substitutions can be made without departing from the spirit and scope of the appended claims.

I claim:

1. An energy absorption device for a rotating shaft comprising a disc mounted concentrically on said shaft, peripheral friction material secured to each side of said disc, a pair of opposed annular brake shoes mounted adjacent said disc of a radial width to engage said friction material, a housing surrounding said disc, torque lugs on said housing to engage corresponding torque lugs on said brake shoes, said housing having flanges extending around the periphery of said discs, each of said flanges having a groove formed therein facing said disc and located opposite said peripheral friction material, an annular piston in each of said grooves, resilient sealing means between said pistons and the bottom of each of said grooves, whereby said pistons may be moved by hydraulic pressure, an annular channel member intermediate said piston and said annular brake shoes, said brake shoes being formed with passages therethrough for the flow of coolant, inlet and outlet connections to said passages, means to introduce hydraulic pressure into said groove for effecting simultaneous opposed axial motion of said brake shoes, and means for circulating coolant through said passages as said brake shoes engage said disc.

2. The energy absorption device of claim 1 in which said annular piston comprises a plurality of ring segments, and bridge members positioned between said adjacent ends of said segments to prevent extrusion of said sealing means.

3. An energy absorption device for a rotating shaft comprising a thin disc mounted concentrically on said shaft, a plurality of segmental brake blocks arranged around the periphery of said disc and secured thereto, a plurality of torque blocks arranged intermediate said brake blocks and secured to said disc, a pair of opposed annular brake shoes mounted adjacent the periphery of said disc to engage said brake blocks, said brake shoes being formed with passages therethrough for the flow of coolant forming a cooling system, inlet and outlet connections to said passages, and means for circulating coolant through said passages as said brake shoes engage said discs, and hydraulic means acting independently of said cooling system for effecting simultaneous opposed axial motion of said brake shoes.

4. An energy absorption device for a rotating shaft comprising a thin disc mounted concentrically on said shaft, a pair of opposed annular hollow brake shoes mounted to engage said disc, said brake shoes being formed with passages therethrough for the flow of coolant, a housing surrounding said disc, torque lugs mounted on said brake shoes to engage portions of said housing, said housing having flanges extending around the periphery of said disc in spaced relation thereto, each of said flanges having a groove formed therein facing said disc, an annular piston in said groove including resilient sealing means, between said piston and said groove, whereby piston may be moved by hydraulic pressure, means to apply hydraulic pressure to said pistons to effect simultaneous opposed axial motion of said brake shoes, and means for circulating coolant through said passages as said brake shoes engage said disc.

References Cited in the file of this patent

UNITED STATES PATENTS

| | | |
|---|---|---|
| 2,082,633 | Johnstone | June 1, 1937 |
| 2,152,489 | Lamb | Mar. 28, 1939 |
| 2,378,100 | Pogue | June 12, 1945 |
| 2,407,699 | Hill | Sept. 17, 1946 |
| 2,466,990 | Johnson et al. | Apr. 12, 1949 |
| 2,614,662 | Hawley | Oct. 17, 1952 |
| 2,664,176 | Whalen | Dec. 29, 1953 |

FOREIGN PATENTS

| | | |
|---|---|---|
| 171,503 | Great Britain | Nov. 24, 1921 |